United States Patent
Stallinger et al.

(10) Patent No.: US 9,197,112 B2
(45) Date of Patent: Nov. 24, 2015

(54) DEVICE FOR DYNAMIC BALANCING OF A ROTATING COMPONENT OF A CENTRIFUGE

(75) Inventors: Thomas Stallinger, Gallneukirchen (AT); Wolfgang Amrheim, Ottensheim (AT); Siegfried Silber, Kirchschlag (AT); Herbert Grabner, Linz (AT)

(73) Assignee: HANNING ELEKTRO-WERKE GmbH & Co. KG, Oerlinghausen (DE)

( * ) Notice: Subject to any disclaimer, the term of this patent is extended or adjusted under 35 U.S.C. 154(b) by 683 days.

(21) Appl. No.: 13/528,926

(22) Filed: Jun. 21, 2012

(65) Prior Publication Data
US 2013/0002063 A1    Jan. 3, 2013

(30) Foreign Application Priority Data

Jun. 30, 2011  (DE) .......................... 10 2011 078 475

(51) Int. Cl.
*H02K 7/16* (2006.01)
*H02K 23/66* (2006.01)
*H02K 11/00* (2006.01)
*H02K 7/10* (2006.01)

(52) U.S. Cl.
CPC . *H02K 7/16* (2013.01); *H02K 11/00* (2013.01)

(58) Field of Classification Search
CPC ................................... H02K 7/16; B04B 9/04
USPC ............ 310/68 B, 68 E, 97, 116, 157, 323.21
See application file for complete search history.

(56) References Cited

U.S. PATENT DOCUMENTS

| | | | | |
|---|---|---|---|---|
| 4,193,536 | A * | 3/1980 | Kubota | 494/14 |
| 5,322,373 | A * | 6/1994 | Oakes et al. | 384/462 |
| 5,437,599 | A | 8/1995 | Feldkamp et al. | |
| 5,496,254 | A * | 3/1996 | Keller et al. | 494/7 |
| 5,921,150 | A | 7/1999 | Romanauskas | |
| 7,883,456 | B2 | 2/2011 | Kusumoto et al. | |
| 2009/0023571 | A1 * | 1/2009 | Kusumoto et al. | 494/7 |
| 2010/0213777 | A1 | 8/2010 | De La Haye et al. | |

FOREIGN PATENT DOCUMENTS

| | | |
|---|---|---|
| DE | 4301485 A1 | 7/1994 |
| DE | 19802950 A1 | 7/1998 |
| DE | 102007040571 A1 | 4/2008 |
| DE | 102009009961 A1 | 9/2010 |
| GB | 1392210 A | 4/1975 |

\* cited by examiner

*Primary Examiner* — Hanh Nguyen
*Assistant Examiner* — Jose Gonzalez Quinones
(74) *Attorney, Agent, or Firm* — Patent Central LLC; Stephen A. Pendorf

(57) ABSTRACT

A device for limiting an unbalance in inside a centrifugal, with an electric motor to drive a rotating component disposed in an enclosure around a rotational axis, wherein a rotor of the electric motor is non-rotatably connected to the rotating component, a bearing assembly for the rotor and the stator to be arranged in, and a stabilizer unit which generates as a function of a disturbing force acting on the rotating component a balancing force that is adapted to compensate said latter, the bearing assembly including support means such as to make the stator radially movable, and the stabilizer arranged radially outside and/or inside said stator and/or support means of the bearing assembly and having stabilizing means whereby in aggregate a radial balancing force can be generated.

9 Claims, 1 Drawing Sheet

DEVICE FOR DYNAMIC BALANCING OF A ROTATING COMPONENT OF A CENTRIFUGE

BACKGROUND OF THE INVENTION

1. Field of the Invention

This present invention relates to a device for dynamic balancing of a rotating component, in particular for limiting unbalance conditions inside a centrifugal, which comprises an electric motor to drive a rotating component disposed in an enclosure around a rotational axis wherein a rotor of the electric motor is non-rotatably connected to the rotating component, a bearing assembly for the rotor and stator to be arranged in, and a stabilizer unit which generates as a function of a disturbing force acting on said rotating component a balancing force that is adapted to compensate said latter.

2. Description of the Related Art

Prior known from DE 198 02 950 A1 is a device for limiting unbalance in a centrifugal which has a rotating component that is rotatably mounted in a frame. This rotating component is driven by an electric motor disposed on a first end of a shaft that is non-rotatably connected to the rotating component. The opposite end of the shaft carries a stabilizer unit by means of which axial balancing forces can be exerted on the shaft to attenuate an unbalance. The drawback affecting this prior known device is that stabilization can be achieved in an axial direction only.

DE 10 2009 009 961 A1 is disclosing a device for limiting unbalance inside a centrifugal which comprises an electric motor to drive a rotating component disposed in a carrier housing, a bearing assembly and a stabilizer unit to generate as a function of a disturbing force a balancing force that is adapted to compensate said latter. The stabilizer unit has magnetic adjusting elements that comprise windings through which current flows and whose current strength is set by a regulating/control unit which reacts in response to sensors that detect disturbing forces. The magnetic adjusting elements may be integrated in a stator of the electric motor on the one hand in which case a stator current simultaneously serves for generating a radial balancing force acting on the shaft while these may also be peripherally staggered relative to the stator windings on the other hand such that they are enabled to exert a radial balancing force separate from the stator. This means that the corrective action takes place in an area close to the rotating shaft.

It is an object of this present invention to improve a device for dynamic balancing of a rotating component, in particular for limiting unbalance in rotating bodies, in such a way that corrective actions can be effectively taken to prevent and/or to reduce such undesirable disturbing influences as unbalance, for instance.

BRIEF SUMMARY OF THE INVENTION

To achieve this object the invention is characterized by the fact that a bearing assembly comprises bearing means such that the stator is radially movable and that the stabilizer unit is in a radial direction disposed outside and/or inside the stator and/or bearing means such that in aggregate a radial balancing force can be generated.

The particular advantage of the invention resides in that a stabilizer unit for compensation of disturbing forces acting on a rotating component can be arranged outside an electric motor. The invention provides for spatial separation of a torque generated by the electric motor and a radial balancing force generated by the stabilizer unit. The electric motor can be provided with a constant air gap as customary between a stator and a rotor. Due to the fact that the stator is radially movable it is possible to apply the balancing force to the stator and from said latter to the shaft via bearing means. The root idea of this invention is to have a radial balancing force exerted on a non-rotating part of the electric motor, i.e. on the stator and/or on a bearing.

A preferred embodiment of this invention provides for the stator to be rigidly attached to a carrier housing that is movable by flexible bearing means in a radial direction at least. This affords the advantage that radial balancing forces can be easily applied to the stator and/or to the electric motor.

According to another preferred embodiment of the invention the stator is coupled to the outside of the stabilizer unit via a bearing of elastomeric material in a radial direction. External attenuation can be advantageously increased this way such that the limit speed may be increased under the aspect of ensuring a stable running performance of the rotating component.

A modification of this invention provides for a permanent-magnetic bias means to be arranged between the stabilizer unit and the stator to thereby improve the introduction of balancing forces.

According to another modification of the invention the carrier housing supporting the electric motor is attached to an enclosure of the centrifugal via an additional adapter casing in which case the stabilizer unit is disposed inside said carrier housing. This affords the advantage that centrifugals affected by unbalance can be retrofitted with unbalance compensating drives since all it takes here is to rigidly attach the carrier housing to the enclosure of the centrifugal via fixing means.

Other advantages of this invention are as disclosed in the further subclaims.

BRIEF DESCRIPTION OF THE SEVERAL VIEWS OF THE DRAWINGS

Exemplary embodiments of this invention will be described in closer detail now with reference to the accompanying drawings.

In these drawings.

DETAILED DESCRIPTION OF THE INVENTION

Figure 1:
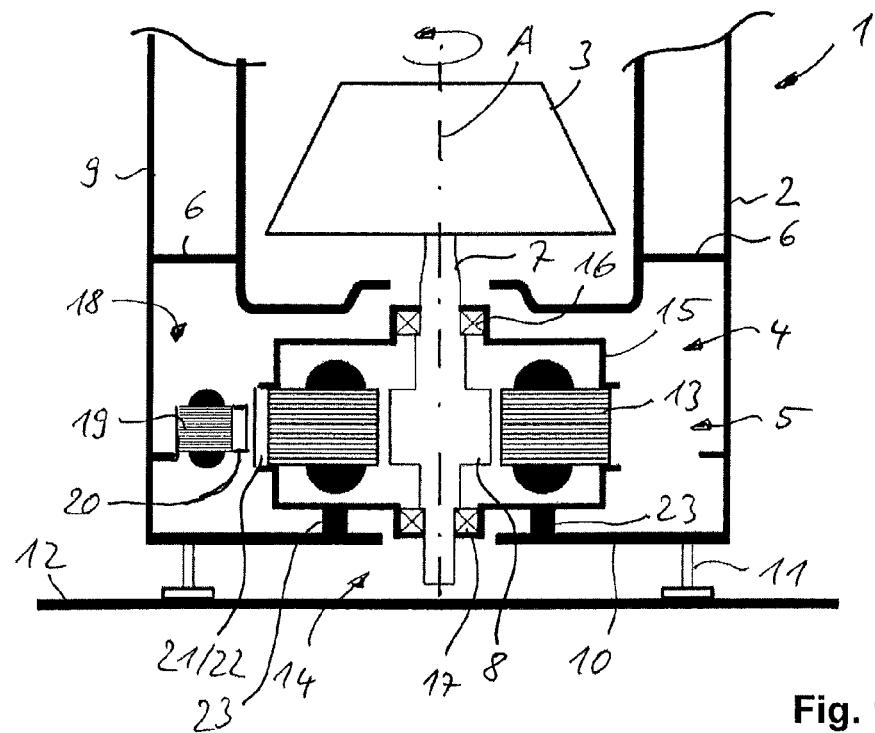
FIG. 1 is a schematic side view of a device of this present invention in a first embodiment.

A device according to this present invention for limiting unbalance can be used in centrifugals, textile machines, domestic appliance or other types of stirrers. Following is a description with reference to the figures of a centrifugal 1 with unbalance limiting devices of different design in the bottom area of the machine.

A centrifugal 1 normally comprises an enclosure 2 in which a rotating component 3 (rotor) is rotated around a vertical axis A by means of a drive unit 4 (electric motor). The enclosure 2 of the centrifugal 1 has a cylindrical side wall 9 and a bottom member 10 and is posted on a horizontal base 12 by means of feet 11 protruding from said bottom member in a spaced relation thereto. The drive unit 4 is disposed in a bottom chamber area 5 of the enclosure 2 which is separated from an upper area of the centrifugal 1 by partitions 6. A non-rotatable connection between the rotating component 3 and a shaft 7 is established via a central bore only. The shaft 7 extends over the entire vertical height of the bottom chamber area 5 and is in non-rotatably connected to a rotor 8 of the electric motor 4.

The electric motor 4 is of internal rotor type with a stator 13 that extends radially outward to a rotor 8 via an air gap.

A bearing assembly 14 is provided for arrangement of the rotor 8 and the stator 13 and/or of the electric motor 4 which comprises a carrier housing 15 as support means. The stator 13 is rigidly attached to that carrier housing 15. The shaft 7 and/or the rotor 8 is arranged via a first bearing 16 (support means) facing the rotating component 3 and an axially offset opposing second bearing 17 (support means) disposed on a shaft side facing away from said rotating component 3 in a manner permitting rotational movement relative to the carrier housing 15.

A stabilizer unit 18 offset radially outward is disposed outside the carrier housing 15 and comprises a number of magnetic adjusting elements 19 (stabilizing means) independent of the number of windings of the stator 13. Said magnetic adjusting elements 19 are current carrying winding assemblies which generate a radial balancing force in response to a signal from a not-shown regulating/control unit to thereby compensate disturbing forces that act on the electric motor 4, in particular on the stator 13, due to unbalance. The electric motor 4 may be of three-phase design. The stabilizer unit 18 may for instance comprise three magnetic adjusting elements arranged at 120° staggers or four magnetic staggers arranged at 90° staggers around the periphery of the stator 13.

Radial attenuating means 20 and preferably permanent-magnetic bias means 21 and preferably a sensor assembly with position sensors 22 are arranged between the magnetic adjusting elements 19 and the stator 13. The radial attenuating means 20 can be attached to the radially movable stator 13 or the radially movable carrier housing 15 on the one hand and/or the stationary enclosure 2, the stabilizer unit 18 (magnetic adjusting elements 19) or a partition 6 on the other hand. The radial attenuating means 20 substantially fills up the air gap between the magnetic adjusting elements 19 and the stator 13.

The radial attenuating means 20 can be made of an elastomeric material, for instance, and can be rigidly connected to the magnetic adjusting elements 19. The bias means 21 and/or the position sensor 22 can be firmly attached to the stator 13. A small air gap is hence normally formed between the magnetic adjusting elements 19 as enlarged by the radial attenuating means 20 and the stator 13. Alternatively, the position sensor 22 may be fixed to the enclosure 2, to the magnetic adjusting elements 19 or to the partition 6 and measure the displacement of the stator 13 and/or the carrier housing 15. Several position sensors also may be distributed.

Advantageously, the bias means 21 permit a stray field to be used as measured variable for a position (for instance via a Hall element) to thereby facilitate the position measuring process. Bias elements 21 without permanent magnets also may be adopted alternatively. The position sensors 22 used must be of a type detecting the radial position of the movable system consisting of shaft 7, rotor 8 and stator 13 in terms of amplitude and phase position (polar coordinates). The position sensors 22 may be of non-contact or contact type. Several sensor levels in axially offset arrangement may be adopted. Alternatively, the position sensor 22 may also be center arranged.

To arrange the stator 13 in a way suitable for movement in radial direction the bearing unit 14 has a resilient foot (support means 23) as an attenuating element through which the carrier housing 15 is attached to the bottom member 10 of the enclosure 2. The stabilizer unit 18 and/or the magnetic adjusting element 19 is rigidly connected to the side wall 9 (longitudinal side of enclosure 2) with the aid of fixing means (screws). In addition to a rotating part system consisting of shaft 7 and rotor 8 there is a movable system comprising the stator 13, the carrier housing 15, the first bearing 16 and the second bearing 17 which is flexibly arranged via the attenuating support means 23 in radial direction.

It is due to said flexible arrangement of the electric motor and/or the stator 13, the enclosure 2 and/or the bottom member 10 that a relatively strong attenuation effect is produced. When the first bearing 16 and the second bearing 17 are of shrink fit type, for instance, a relatively weak internal attenuation can be obtained. Since this makes the external-plus-internal attenuation quotient relatively large it is possible to increase the limit speed to a value at which a stable running performance of a rotating component 3 will be ensured.

A position sensor 22 used in the form of a Hall sensor for position detection may be replaced by an additional position sensor 24 which in an axially offset relation to the stator 13 is seated against a longitudinal wall 25 of the carrier housing 15.

The electric motor 4 may for instance be of asynchronous, synchronous or reluctance type.

The process for limiting unbalance in a centrifugal takes place as follows: The sensors 22 and/or 24 detect the actual radial position of the stator 13. When the radial position of the stator 13 has been found to deflect from a defined position particularly due to unbalance forces and/or unbalance torques, the regulating/control unit emits a respective drive signal which is applied to the magnetic adjusting elements 19 in such a way that a radial balancing force is generated which compensates and/or attenuates such unbalance forces.

Figure 2:
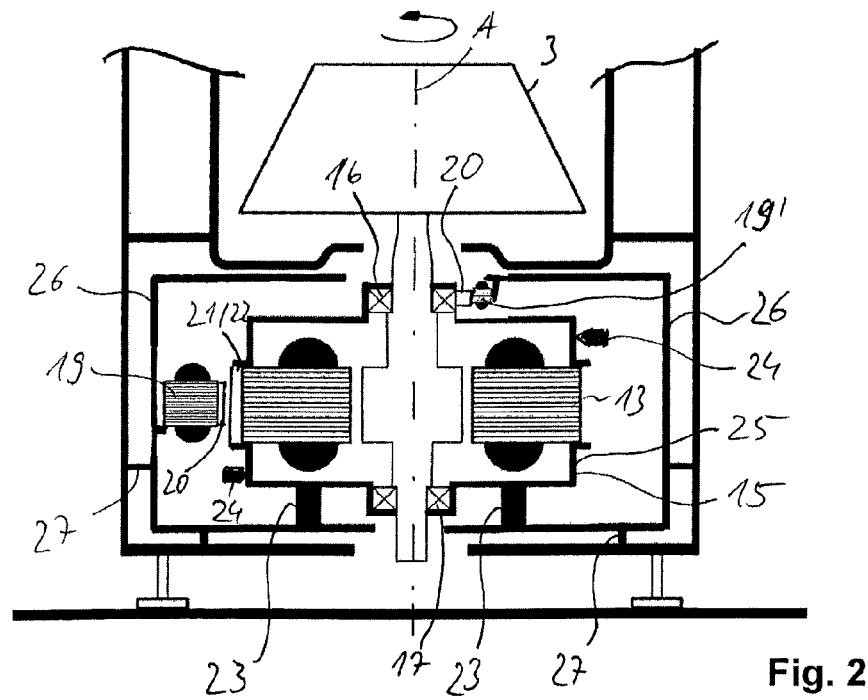
FIG. 2 is a schematic side view of that device in a second embodiment.

In a second embodiment of this invention according to FIG. 2 the magnetic adjusting element 19 is rigidly connected not to the enclosure 2 (as in case of the embodiment according to FIG. 1), but preferably to a pot-shaped adapter casing 26 which encloses the magnetic adjusting elements 19 on the one hand and the electric motor 4 on the other hand and which is a separate structural unit that under retrofit conditions can be subsequently installed into the bottom chamber 5 of the centrifugal 1, preferably with the aid of threaded fixing means 27.

Identical components and/or component functions in the exemplary embodiments described are denoted by identical reference signs.

The flexible support means 23 are arranged between carrier housing 15 and adapter casing 26.

Other than the first embodiment has the second embodiment a number of axially offset magnetic adjusting elements 19, 19' with said further magnetic adjusting element 19' arranged via appropriate radial attenuating means 20 in the area of the first bearing 16. The axially offset arrangement of the magnetic adjusting elements 19, 19' results in an improved reduction of vibrations.

The device of this present invention leads to an active variation of rigidity and an attenuation of the movable system dependent on actual disturbing forces and unbalances that may occur.

Preferably, the angular position of the rotor is determined for activating the electric motor 4 and/or the control/regulating unit.

The invention is not restricted to the internal rotor type motor hereinbefore described. Alternatively, the electric motor may be of external or pancake rotor type. The stabilizer unit would be arranged radially inward of the stator in case of an external rotor type motor.

The movable system comprising shaft 7, rotor 8 and stator 13 is preferably movable not only in radial direction, but also enabled to perform tilting movements because the radial attenuating means 20 are made of an elastomeric material and/or arranged in different levels.

The invention claimed is:

1. A device for dynamic balancing of a rotating component, which comprises
    an electric motor to drive a rotating component disposed in an enclosure (2) around a rotational axis, wherein a rotor of the electric motor is non-rotatably connected to the rotating component,
    a bearing assembly for the rotor and the stator to be arranged in, and
    a stabilizer unit which generates as a function of a disturbing force acting on the rotating component a balancing force that is adapted to compensate said latter,
    wherein the bearing assembly (14) comprises support means such as to make the stator (13) radially movable, and that the stabilizer unit (18) is arranged radially outside and/or inside said stator (13) and/or support means of the bearing assembly and comprises stabilizing elements such that in aggregate a radial balancing force can be generated, and
    wherein a radial attenuating means (20) and/or a permanent-magnetic bias means (21) is arranged between a magnetic adjusting element (19) and the stator (13).

2. The device according to claim 1, wherein the bearing assembly (14) comprises as support means a carrier housing (15) to which the stator (13) is rigidly attached.

3. The device according to claim 1, wherein the support means of the bearing assembly (14) include attenuating elements to make the stator flexible relative to the stabilizer unit and/or the enclosure (2) in a radial direction.

4. The device according to claim 1, wherein the first bearing (16) and/or the second bearing (17) is a shrink-fit bearing through which the rotor (8) is rigidly attached to the shaft (8) that is non-rotatably connected to the rotating component (3).

5. A device for dynamic balancing of a rotating component, which comprises
    an electric motor to drive a rotating component disposed in an enclosure around a rotational axis, wherein a rotor of the electric motor is non-rotatably connected to the rotating component,
    a bearing assembly for the rotor and the stator to be arranged in, and
    a stabilizer unit which generates as a function of a disturbing force acting on the rotating component a balancing force that is adapted to compensate said latter,
wherein the bearing assembly (14) comprises support means such as to make the stator (13) radially movable, and that the stabilizer unit (18) is arranged radially outside and/or inside said stator (13) and/or support means of the bearing assembly and comprises stabilizing elements such that in aggregate a radial balancing force can be generated,
    wherein the carrier housing (15) is attached to a bottom member of the enclosure (2) via an attenuating element provided as a flexible support means (23) and
    wherein the stabilizer unit (18) is rigidly secured to an inner longitudinal side of the enclosure (2).

6. A device for dynamic balancing of a rotating component, which comprises
    an electric motor to drive a rotating component disposed in an enclosure around a rotational axis, wherein a rotor of the electric motor is non-rotatably connected to the rotating component,
    a bearing assembly for the rotor and the stator to be arranged in, and
    a stabilizer unit which generates as a function of a disturbing force acting on the rotating component a balancing force that is adapted to compensate said latter,
wherein the bearing assembly (14) comprises support means such as to make the stator (13) radially movable, and that the stabilizer unit (18) is arranged radially outside and/or inside said stator (13) and/or support means of the bearing assembly and comprises stabilizing elements such that in aggregate a radial balancing force can be generated,
    wherein the carrier housing (15) is attached to a bottom member of an adapter casing (26) to which the stabilizer unit (18) is rigidly fixed, and
    wherein the adapter casing (26) is secured to the enclosure (2) via fixing means.

7. The device according to claim 1, wherein a regulating/control unit is provided to activate the stabilizer unit (18).

8. The device according to claim 1, wherein a sensor assembly is provided by means of which the radial position of the movable system consisting of rotor (8), stator (13) and flexible support means (23) can be detected in terms of amplitude and phase position, and that said sensor assembly is of non-contact or contact type and/or arranged centrally and/or in several sensor levels disposed in axially offset distribution.

9. The device according to claim 8, wherein the sensor assembly is adapted to detect position-dependent variations of a magnetic field of a permanent-magnetically generated bias of the stabilizer unit (18) for position measurement that is generated by the permanent-magnetic bias means (21).

* * * * *